United States Patent
Castelli et al.

(10) Patent No.: US 11,651,270 B2
(45) Date of Patent: May 16, 2023

(54) SEARCH, QUESTION ANSWERING, AND CLASSIFIER CONSTRUCTION

(71) Applicant: INTERNATIONAL BUSINESS MACHINES CORPORATION, Armonk, NY (US)

(72) Inventors: Vittorio Castelli, Croton on Hudson, NY (US); Radu Florian, Danbury, CT (US); Taesun Moon, Scarsdale, NY (US); Avirup Sil, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1311 days.

(21) Appl. No.: 15/077,303

(22) Filed: Mar. 22, 2016

(65) Prior Publication Data

US 2017/0278011 A1    Sep. 28, 2017

(51) Int. Cl.
*G06N 20/00* (2019.01)
*G06N 20/20* (2019.01)
*G06F 16/332* (2019.01)

(52) U.S. Cl.
CPC ......... *G06N 20/00* (2019.01); *G06F 16/3326* (2019.01); *G06N 20/20* (2019.01)

(58) Field of Classification Search
None
See application file for complete search history.

(56) References Cited

U.S. PATENT DOCUMENTS

| | | | | |
|---|---|---|---|---|
| 6,973,418 | B1 * | 12/2005 | Kirshenbaum | G06N 5/022 703/2 |
| 7,979,365 | B2 * | 7/2011 | Goldberg | G06N 20/00 706/13 |
| 8,423,951 | B1 * | 4/2013 | Koller | G06F 8/10 717/104 |
| 2015/0105272 | A1 | 4/2015 | Anastassiou et al. | |
| 2015/0206319 | A1 | 7/2015 | Dollar et al. | |

OTHER PUBLICATIONS

Talbot, Justin et al. "EnsembleMatrix: Interactive Visualization to Support Machine Learning with Multiple Classifiers." CHI'09 [Published 2009] [Retrieved Jun. 2019] <URL: https://dl.acm.org/citation.cfm?id=1518895> (Year: 2009).*

(Continued)

*Primary Examiner* — Viker A Lamardo
*Assistant Examiner* — Fen Christopher Tamulonis
(74) *Attorney, Agent, or Firm* — Tutunjian & Bitetto, P.C.; Stosch Sabo

(57) ABSTRACT

A method and system are provided for combining models. The method includes forming, by a computer having a processor and a memory, model pairs from a model ensemble that includes a plurality of models. The method further includes comparing the model pairs based on sets of output results produced by the model pairs to provide comparison results. The method also includes constructing, by the computer, a combination model from at least one of the model pairs based on the comparison results. The comparing step is performed using user-generated set-based feedback.

8 Claims, 10 Drawing Sheets

(56) References Cited

OTHER PUBLICATIONS

Ferrucci, David et al. "Building Watson: An Overivew of the DeepQA Project" AAAI Fall 2010 [Published 2010] [Retrieved Jul. 2019] <URL: https://www.aaai.org/ojs/index.php/aimagazine/article/view/2303 > (Year: 2010).*

Leite, Rui et al. "Selecting Classification Algorithms with Active Testing on Similar Datasets" MLDM'12 [Published 2012] [Retrieved Online Jul. 2019] <URL: http://citeseerx.ist.psu.edu/viewdoc/summary?doi=10.1.1.416.9998> (Year: 2012).*

Fogarty, James et al. "CueFlik: interactive Concept Learning in Image Search" CHI'08 [Published 2008] [Retrieved Online Jun. 2019] <URL: https://dl.acm.org/citation.cfm?id=1357061> (Year: 2008).*

Van den Elzen, Stef et al. "BaobabView: Interactive Construction and Analysis of Decision Trees" VAST '11 [Published 2011] [Retrieved Online Jun. 2019] <URL: https://ieeexplore.ieee.org/document/6102453> (Year: 2011).*

Stumpf, Simone et al. "Toward Harnessing User Feedback for Machine Learning" IUI '07 [Published 2007] [Retrieved Online Jun. 2019] <URL: https://dl.acm.org/citation.cfm?id=1216316> (Year: 2007).*

Patel, Kayur et al. "Using Multiple Models to Understand Data" 22nd IJCAI '11 [Published 2011] [Retrieved online Jun. 2019] <URL: https://www.ijcai.org/Proceedings/11/Papers/289.pdf> (Year: 2011).*

Brooks, Michael et al. "FeatureInsight: Visual Support for Error Driven Feature Ideation in Text Classification" VAST '15 [Published 2015] [Retrieved Jun. 2019] <URL: https://ieeexplore.ieee.org/abstract/document/7347637?section=abstract> (Year: 2015).*

Amershi, Saleema et al. "ModelTracker: Redesigning Performance Analysis Tools for Machine Learning" CHI' 2015 [Published 2015] [Retrieved Jun. 2019] <URL: http://saleemaamershi.com/papers/amershi.CHI2015.ModelTracker.pdf> (Year: 2015).*

Amershi, Saleema et al. "Power to the People: The role of humans in Interactive Machine Learning" AAAI vol. 35 No. 4 [Published 2014] [Retrieved Online Jun. 2019] <URL: https://www.aaai.org/ojs/index.php/aimagazine/article/view/2513> (Year: 2014).*

Llora, Xavier et al. "Combating User Fatigue in iGAs: Partial Ordering, Support Vector Machines, and Synthetic Fitness" GECCO' 05 [Published 2005] [Retrieved Dec. 17, 2019] <URL: https://dl.acm.org/citation.cfm?id=1068228> (Year: 2005).*

Vemulapalli, Smita et al. "Classifier Combination Techniques applied to Coreference Resolution." NAACL HLT [Published 2009] [Retrieved Feb. 2020] <URL: https://www.aclweb.org/anthology/N09-3001.pdf> (Year: 2009).*

Not available, "Proceedings of 5th conference on Design of experiments in Army Research . . . " DTIC [Published 1960] [Retrieved Feb. 2020] <URL: https://apps.dtic.mil/dtic/tr/fulltext/u2/a417190.pdf#page=15> (Year: 1960).*

Centeno R., Hermoso R., Fasli M. (2013) Extracting Reputation with Knock-Out Tournament-Based Pairwise Elicitation in Complex Social Networks. In: Agreement Technologies. Lecture Notes in Computer Science, vol. 8068. Springer, Berlin, Heidelberg. https://doi.org/10.1007/978-3-642-39860-5_13 (Year: 2013).*

Salter, Alexander W. "En Garde! Tournament Asymmetry and Disincentive Effects in . . . competitions" Occidental College [Published 2010] [Retrieved May 2021] <URL: https://scholar.oxy.edu/bitstream/handle/20.500.12711/9077/HCOMPSFINAL.pdf?sequence=1&isAllowed=y> (Year: 2010).*

Poli et al. "Genetic Programming with User-Driven Selection . . . " citeseerx [Published 1997] [retrieved Dec. 2021] <URL: http://citeseerx.ist.psu.edu/viewdoc/download?doi=10.1.1.37.3820&rep=rep1&type=pdf> (Year: 1997).*

Sun, Q. (2014). Meta-Learning and the Full Model Selection Problem (Thesis, Doctor of Philosophy (PhD)). University of Waikato, Hamilton, New Zealand. Retrieved from https://hdl.handle.net/10289/8520 (Year: 2014).*

T. Takahama and S. Sakai, "Learning game players by an evolutionary approach using pairwise comparison without prior knowledge," 2015 International Conference on Intelligent Informatics and Biomedical Sciences (ICIIBMS), 2015, pp. 121-127, doi: 10.1109/ICIIBMS.2015.7439514. (Year: 2015).*

E. Kocaguneli, T. Menzies and J. W. Keung, "On the Value of Ensemble Effort Estimation," in IEEE Transactions on Software Engineering, vol. 38, No. 6, pp. 1403-1416, Nov.-Dec. 2012, doi: 10.1109/TSE.2011.111. (Year: 2012).*

Zheng, et al., "Reidentification by Relative Distance Comparison" IEEE Transaction on Pattern Analysis and Machine Intelligence, Mar. 2013, pp. 653-668, vol. 35, No. 3.

Althuwaynee, et al., "A Novel Ensemble Bivariate Statistical Evidential Belief Function with Knowledge-based Analytical Hierarchy Process and Multivariate Statistical Logistic Regression for Landslide Susceptibility Mapping" Catena, Mar. 2014, pp. 21-36, vol. 114.

Yu, et al., "An Intelligent-agent-based Fuzzy Group Decision Making Model for Financial Multicriteria Decision Support: The Case of Credit Scoring" European Journal of Operational Research, Jun. 2009, pp. 942-959, vol. 195, No. 3.

Wang, et al., "A Comparative Study of ensemble feature selection techniques for software defect prediction" IEEE 2010 Ninth International Conference on Machine Learning and Applications (ICMLA), Dec. 2010, pp. 135-140.

Bibimoune, et al., "An Empirical Comparison of Supervised Ensemble Learning Approaches" International Workshop on Complex Machine Learning Problems with Ensemble Methods, Sep. 2013, pp. 1-16.

Xiao-Bin, W. et al., "A Method of Remote Fault Diagnosis Based on Analytical Hierarchy Process" 2008 IEEE Conference on Robotics, Automation and Mechatronics, Sep. 2008, pp. 693-696.

Qian, C. et al., "Pareto Ensemble Pruning" Proceedings of the Twenty-Ninth AAAI Conference on Artificial Intelligence, Feb. 2015, pp. 2935-2941.

* cited by examiner

SEARCH, QUESTION ANSWERING, AND CLASSIFIER CONSTRUCTION

STATEMENT REGARDING FEDERALLY SPONSORED RESEARCH OR DEVELOPMENT

This invention was made with Government support under Contract No. HR0011-12-C-0015 awarded by the Defense Advanced Research Projects Agency (DARPA). The Government has certain rights in this invention.

BACKGROUND

Technical Field

The present invention generally relates to machine learning and reasoning, and more particularly to model combination and system adaptation using set-based user feedback for search, question answering, and classifier construction.

Description of the Related Art

Most cognitive systems use a set of models to select and classify responses, and a way of combining the results of the model. The combination stage is crucial to the success of the system. The combination stage is typically a trained system, and many approaches exist to building this stage, which might or might not account for the reliability of each of the underlying models.

The four main approaches to building models for cognitive applications, including question answering and search, are as follows: rule-based; unsupervised; distant supervision; and supervised/semi-supervised.

Regarding the rule-based approach, the rules are built manually and are difficult to maintain and extend. Regarding the unsupervised approach, the same uses a large amount of data to find groups with the hope that the groups have associated semantics, and builds models accordingly. However, the data is typically grouped into groups that lack the desired semantics. Regarding the distant supervision approach, the same uses labels that are somewhat related to the response of interest, but needs a very large amount of data to smooth the noise, and can only get a model that is as good as the strength of the association between the proxy variable and the desired response. Regarding the supervised/semi-supervised approach, the same requires manually labeling all/some of the data with the desired response, and building a model such that the model captures the desired semantics. However, manually labeling data is an expensive process.

Thus, there is a need for an improved approach for model combination and system adaptation for search, question answering, and classifier construction.

SUMMARY

According to an aspect of the present principles, a method is provided for combining models. The method includes forming, by a computer having a processor and a memory, model pairs from a model ensemble that includes a plurality of models. The method further includes comparing the model pairs based on sets of output results produced by the model pairs to provide comparison results. The method also includes constructing, by the computer, a combination model from at least one of the model pairs based on the comparison results. The comparing step is performed using user-generated set-based feedback.

According to another aspect of the present principles, a non-transitory computer readable storage medium is provided. The non-transitory computer readable storage medium includes a computer readable program for combining models. The computer readable program when executed on a computer causes the computer to perform steps of a method. The method includes forming model pairs from a model ensemble that includes a plurality of models. The method further includes constructing a combination model from at least one of the model pairs based on comparison results. The comparison results are obtained by comparing the model pairs based on sets of output results produced by the model pairs using user-generated set-based feedback.

According to yet another aspect of the present principles, a system is provided. The system includes a computer, having a processor and a memory. The computer is configured to form model pairs from a model ensemble that includes a plurality of models. The computer is further configured to construct a combination model from at least one of the model pairs based on comparison results. The comparison results are obtained by comparing the model pairs based on sets of output results produced by the model pairs using user-generated set-based feedback.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

The present principles are directed to model combination and system adaptation using set-based user feedback for search, question answering, and classifier construction.

In an embodiment, the present principles provide an approach for improving the efficiency of labeling data for building cognitive applications In an embodiment, an approach is described for using set judgment rather than individual judgments to create trained cognitive models. This approach substantially reduces the cost of getting high-quality human annotations which are essential to producing cognitive models with high accuracy.

In an embodiment, the present principles provide an approach for combining several (machine-learning) models, for example, for tasks such as, but not limited to, search, question answering, and classifier construction. In an embodiment, the present principles take into consideration the "weighted" effect of all the models applied for solving the tasks.

In an embodiment, the present principles involve building a model combination system based on a pairwise comparison of underlying models. In an embodiment, the underlying comparison is based on the perceived quality of result sets, rather than on individual results. The model combination system can be applied to many different types of data including, but not limited to, textual data, image data, and so forth.

One or more embodiments of the present principles are based on the following rationale: humans are much better at comparing two groups of results than at ranking multiple groups simultaneously; and a pairwise comparison generally works in many endeavors, such as in sports. Thus, in an embodiment, humans perform a pairwise comparison of component models based on sets of results produced by the systems. Thereafter, a model combination system is built using the pairwise annotations performed by the humans as training data.

Figure 1:
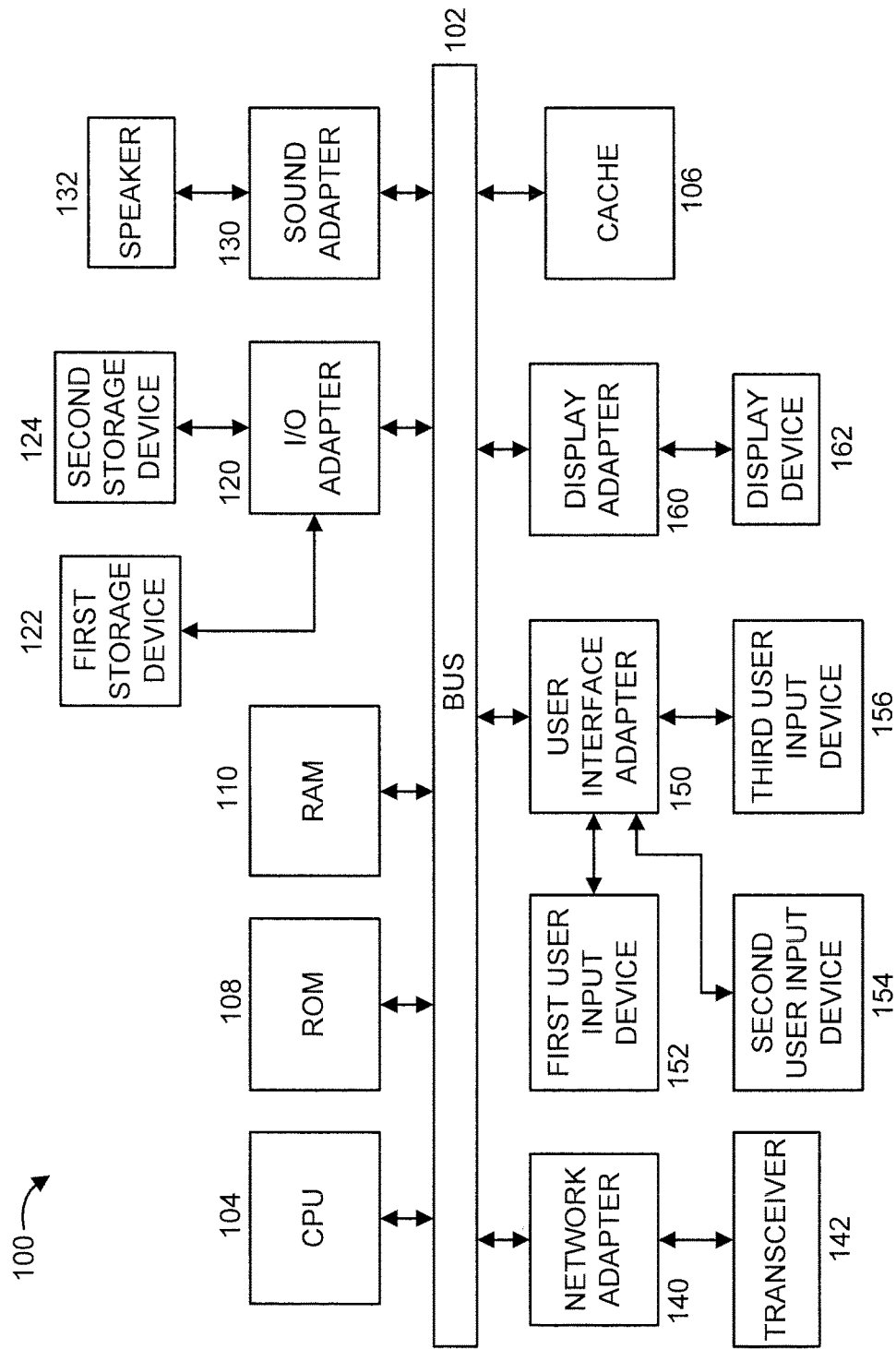
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 8:
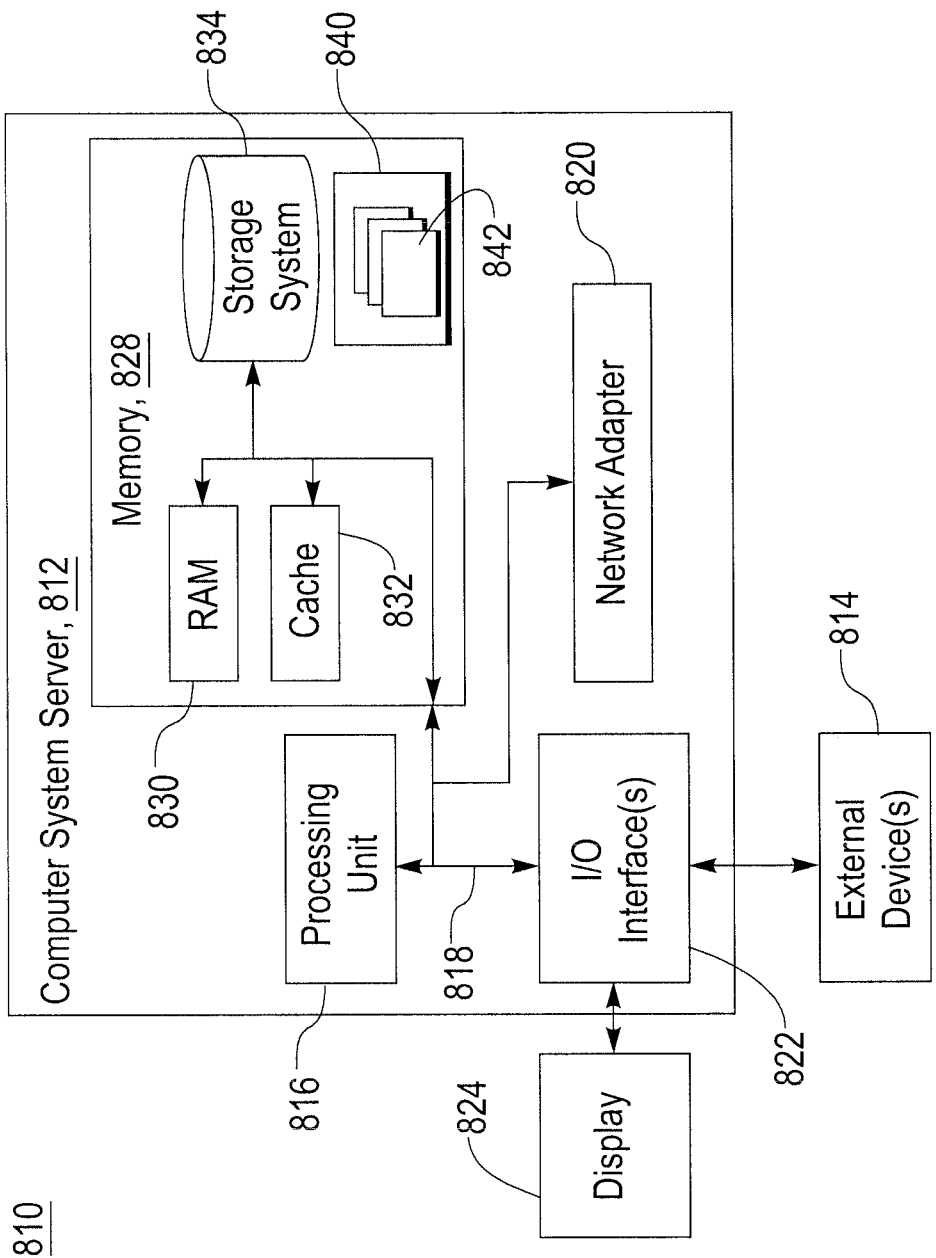
FIG. 8 shows an exemplary cloud computing node, in accordance with an embodiment of the present principles.
Figure 9:
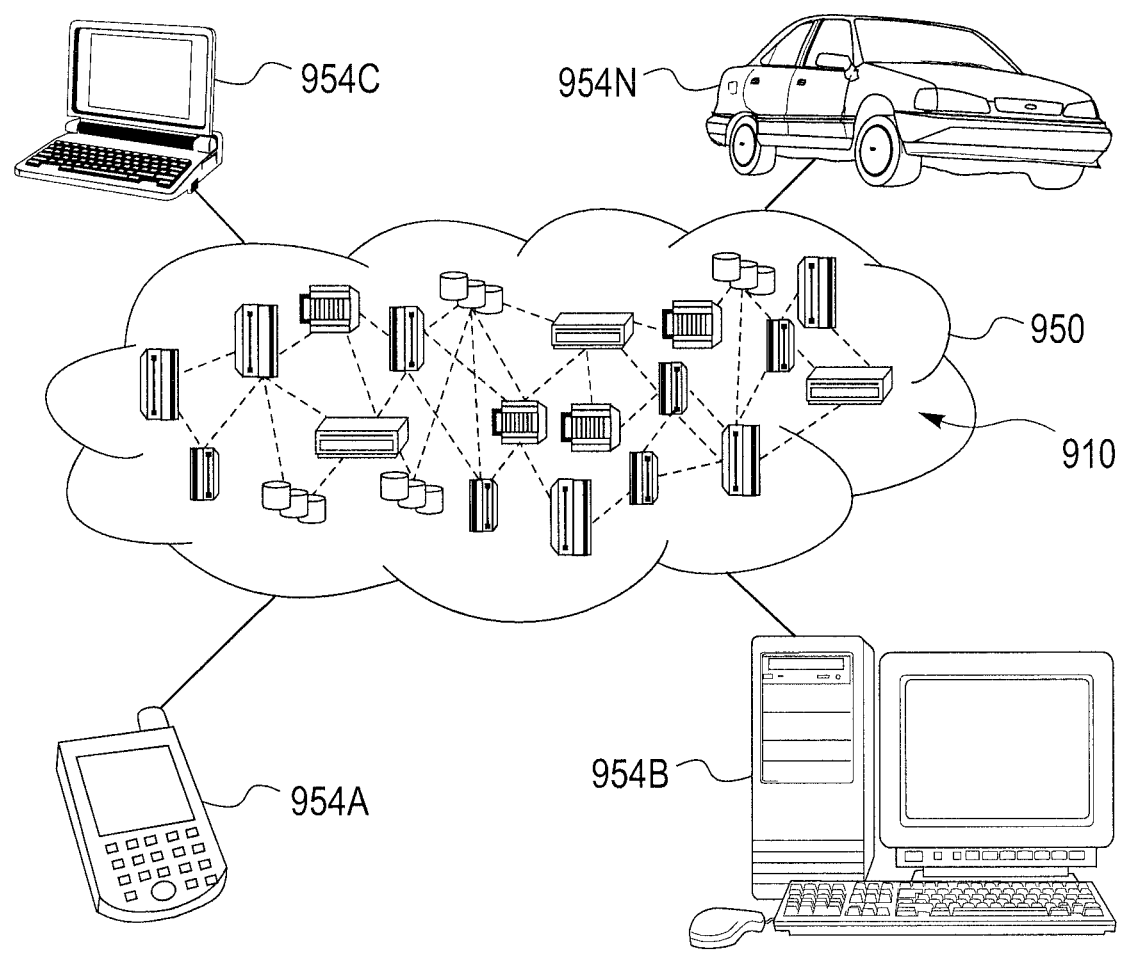
FIG. 9 shows an exemplary cloud computing environment, in accordance with an embodiment of the present principles.
Figure 10:
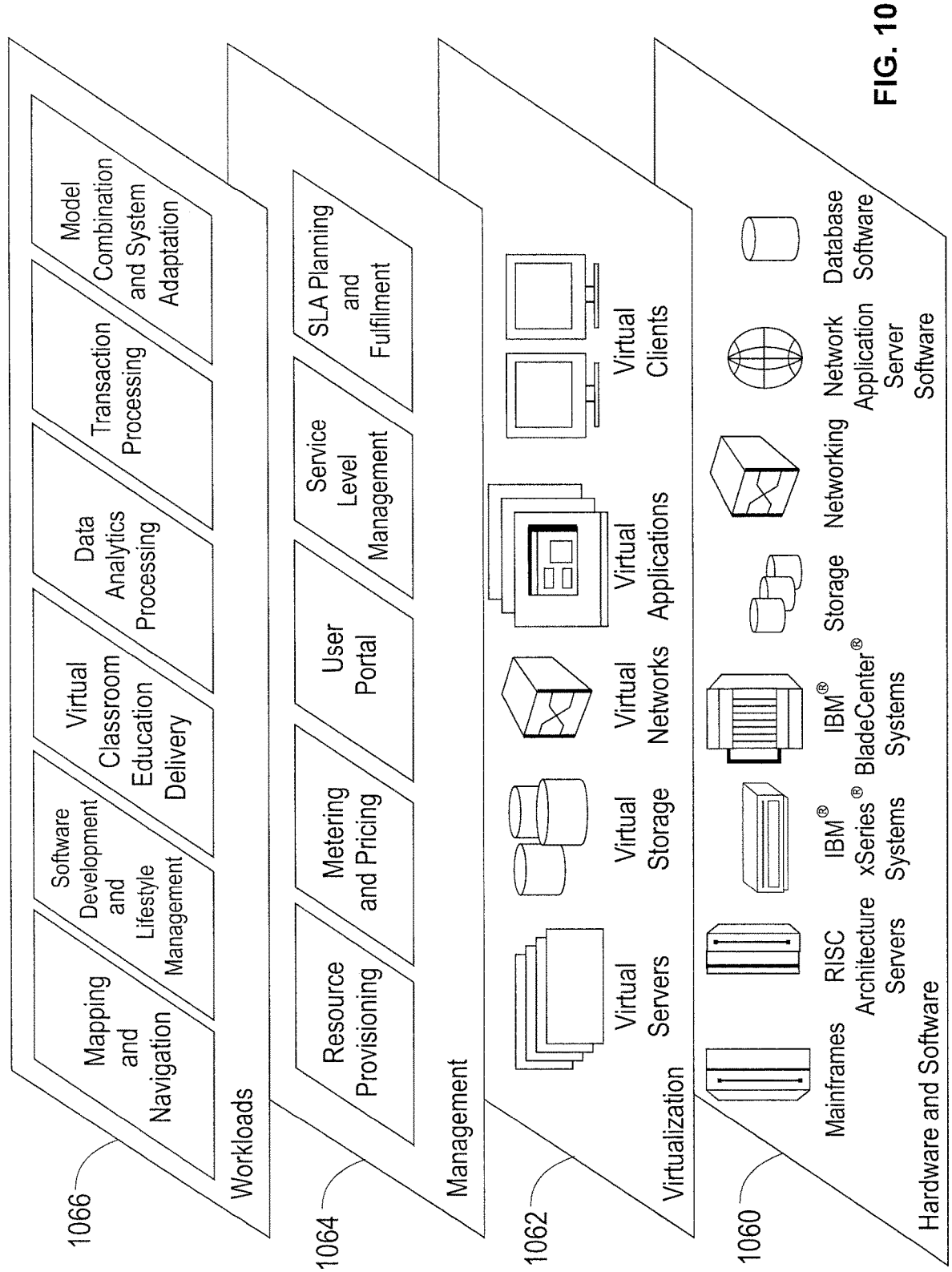
FIG. 10 shows exemplary abstraction model layers, in accordance with an embodiment of the present principles.

In an embodiment, system 100 is implemented as a server in a cloud configuration (see, e.g., FIGS. 8-10). For example, system 100 can include one or more model combinations formed in accordance with the teachings of the present principles, where such model combinations in the server are used to provide search results responsive to a search query, an answer responsive to a subject matter or other query, and a classification of an object responsive to a classification query. Model construction can involve calculating and/or recalculating model coefficients and other model building/combining processes as readily appreciated by one of ordinary skill in the art given the teachings of the present principles provided herein.

Figure 2:
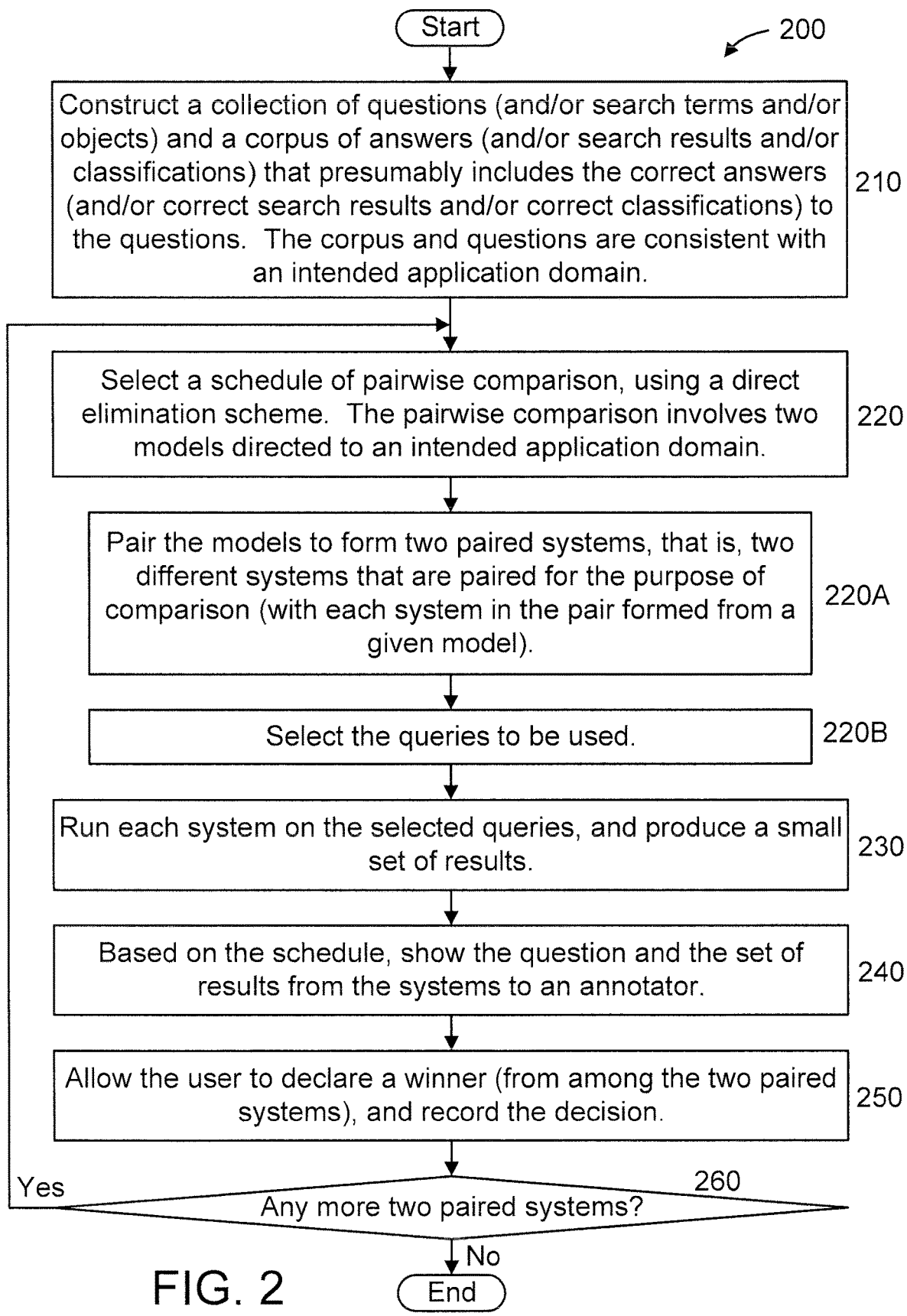
FIG. 2 shows an exemplary method for constructing a question answering system, in accordance with an embodiment of the present principles.

FIG. 2 shows an exemplary method 200 for constructing a question answering system, in accordance with an embodiment of the present principles.

At step 210, construct a collection of questions (queries) and a corpus of answers that presumably includes the correct answers to the questions. The corpus and questions are consistent with an intended application domain. Moreover, while step 210 refers to questions and answers, in an embodiment, a collection of search terms and a corpus of search results that presumably include the correct (most applicable) search results for the search terms can be constructed. Also, in an embodiment, a collection of objects to be classified and a corpus of classifications for the objects can be constructed. Thus, the information implicated in the construction performed at step 210 depends on the intended application to which the present principles will be applied. Hence, the present principles can involve the preceding and other intended application domains while maintaining the spirit of the present principles.

At step 220, select a schedule of pairwise comparison, using a direct elimination scheme. The pairwise comparison involves two models directed to an intended application domain. Thus, for example, the pairwise comparison can involve evaluating the models with respect to their ability to provide the correct answers to the questions used in step 210, and/or evaluating the models with respect to their ability to provide the correct search results for the search terms, and/or evaluating the models with respect to their ability to provide the correct classifications for the objects. Again, as mentioned above, the models with be compared with respect to an intended application domain, which can vary depending on user needs/selection. For illustrative sake, the embodiment of FIG. 2 will proceed with reference to the collection of questions and corpus of answers constructed at step 210.

In an embodiment, step 220 includes steps 220A and 220B.

At step 220A, pair the models to form two paired systems, that is, two different systems that are paired for the purpose of comparison (with each system in the pair formed from a given model).

At step 220B, select the queries to be used.

At step 230, run each system on the selected queries, and produce a small set of results.

At step 240, based on the schedule, show the question and the set of results from the systems to an annotator.

At step 250, allow the user to declare a winner (from among the two paired systems), and record the decision. For example, for a QA system, the annotator checks whether the answers provided by the models are correct with respect to the questions that results in the answers. In particular, the annotator determines whether the questions match the answers that were expected as per the constructing performed at step 210.

Further regarding step 250, it is to be appreciated that there are two possibilities here: one is that the user declares a winner based on multiple questions; and one is that the user declares a winner for each of the questions. In an embodiment, the latter approach is employed, although the former can be used noting that the former involves a substantially higher cognitive load on the part of the annotator At step 260, it is determined if there are any other two paired systems to be evaluated. If so, then return to step 220. Otherwise, terminate the method.

Figure 3:
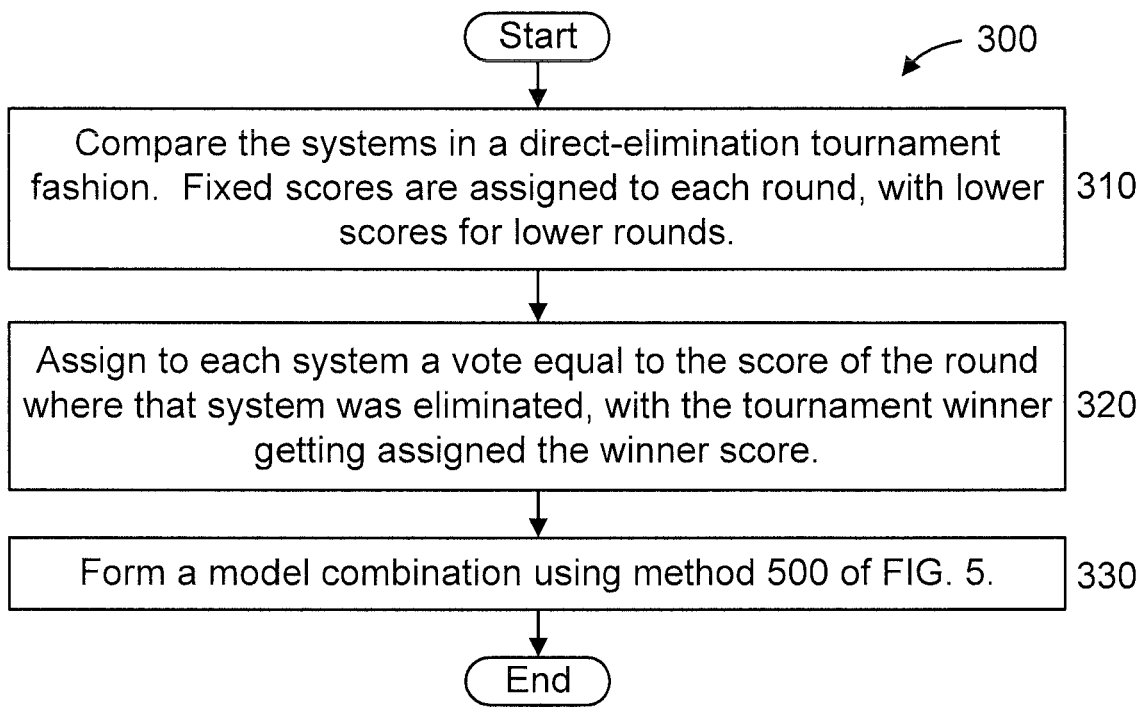
FIG. 3 shows an exemplary method for building a system combination model, in accordance with an embodiment of the present principles.
Figure 4:
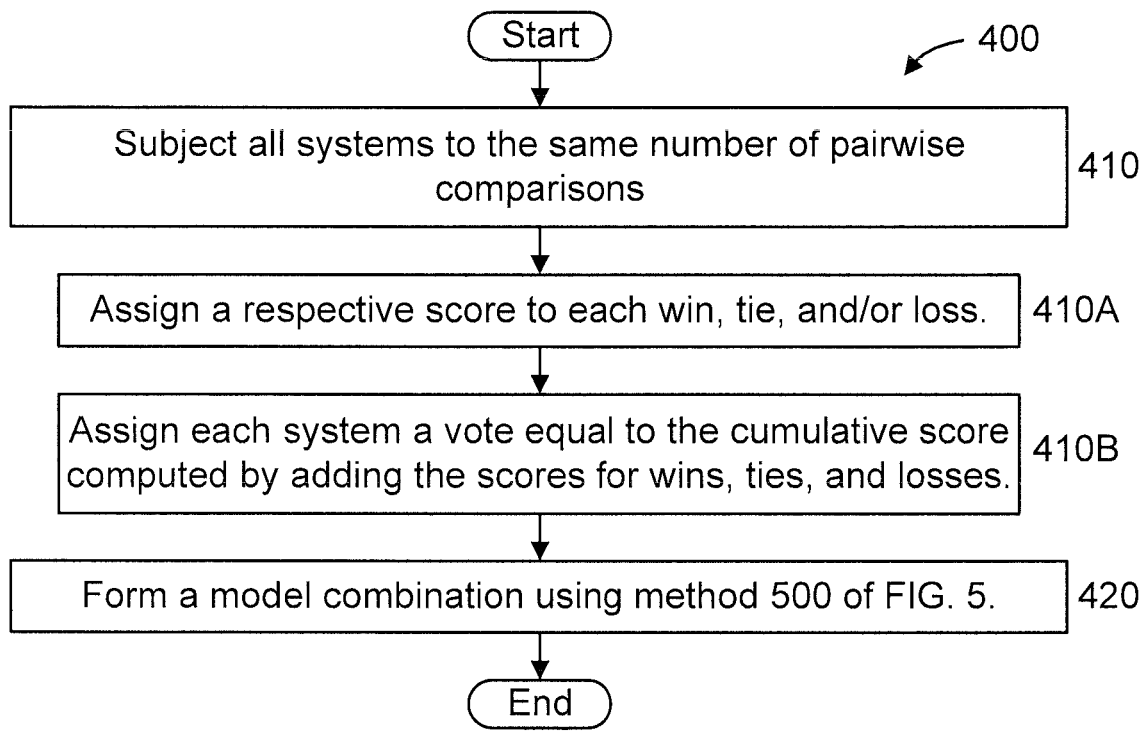
FIG. 4 shows another exemplary method for building a system combination model, in accordance with an embodiment of the present principles.

Regarding step 250, scoring can be made on the results of the two paired systems using, for example, method 300 of FIG. 3 or method 400 of FIG. 4.

FIG. 3 shows an exemplary method 300 for building a system combination model, in accordance with an embodiment of the present principles. In an embodiment, method 300 provides a scoring method for step 250 of method 200.

At step 310, compare the systems in a direct-elimination tournament fashion. Fixed scores are assigned to each round, with lower scores for lower rounds (that is, the winning score for each round is incrementally larger than the winning score for the round immediately preceding it).

At step 320, assign to each system a vote equal to the score of the round where that system was eliminated, with the tournament winner getting assigned the winner score.

Figure 5:
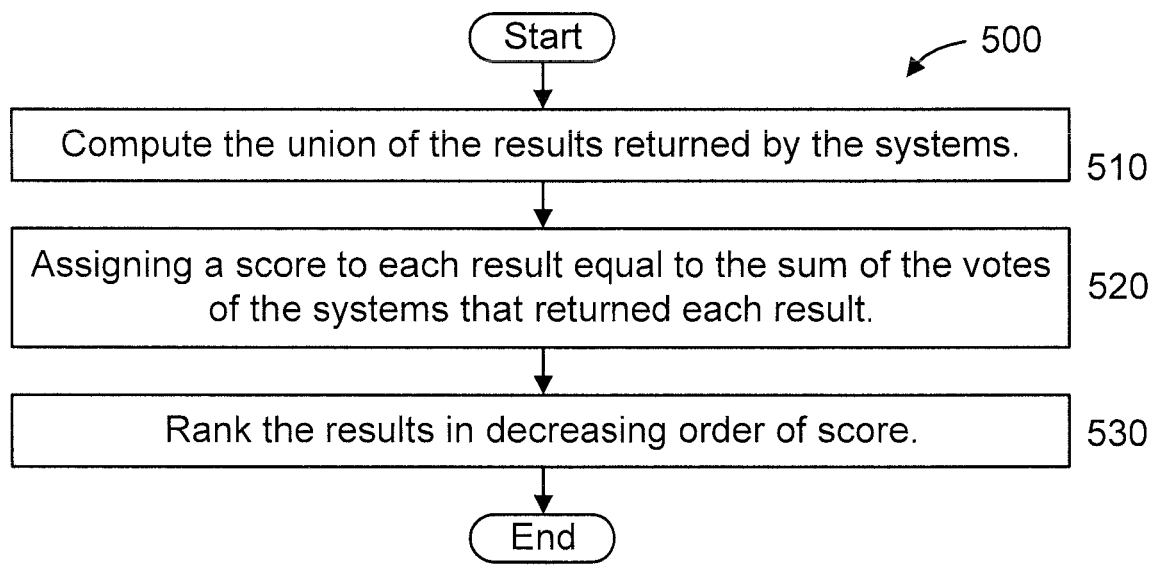
FIG. 5 shows an exemplary method for forming a model combination (a combination of models), in accordance with an embodiment of the present principles.

At step 330, form a model combination using method 500 of FIG. 5.

FIG. 4 shows another exemplary method 400 for building a system combination model, in accordance with an embodiment of the present principles. In an embodiment, method 400 provides a scoring method for step 250 of method 200.

At step 410, subject all systems to the same number of pairwise comparisons (such as in, for example, regular season professional sports).

In an embodiment, step 410 includes steps

At step 410A, assign a respective score to each win, tie, and/or loss.

At step 410B, assign each system a vote equal to the cumulative score computed by adding the scores for wins, ties, and losses.

At step 420, form a model combination using method 500 of FIG. 5.

Figure 6:
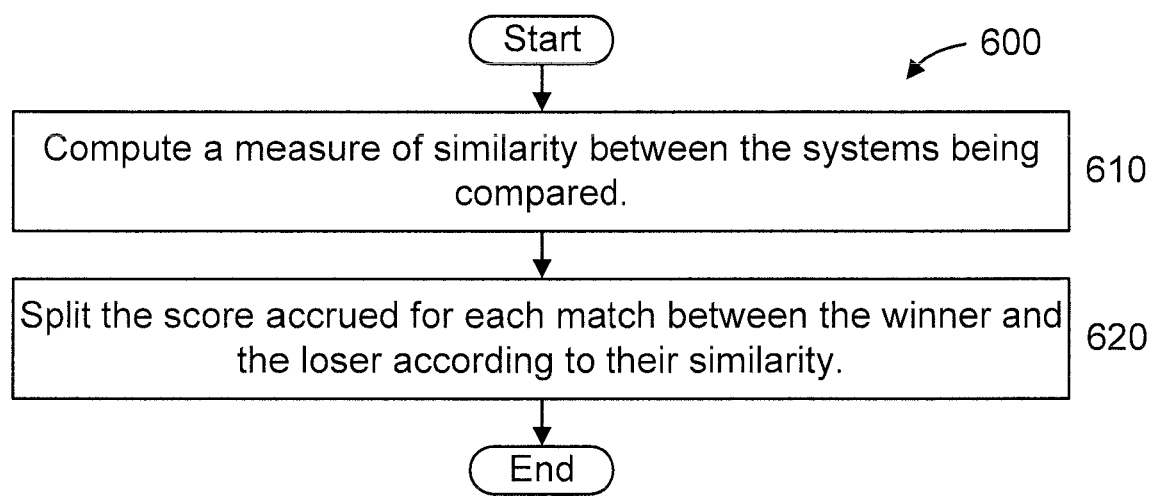
FIG. 6 shows yet another exemplary method for building a system combination model, in accordance with an embodiment of the present principles.
Figure 7:
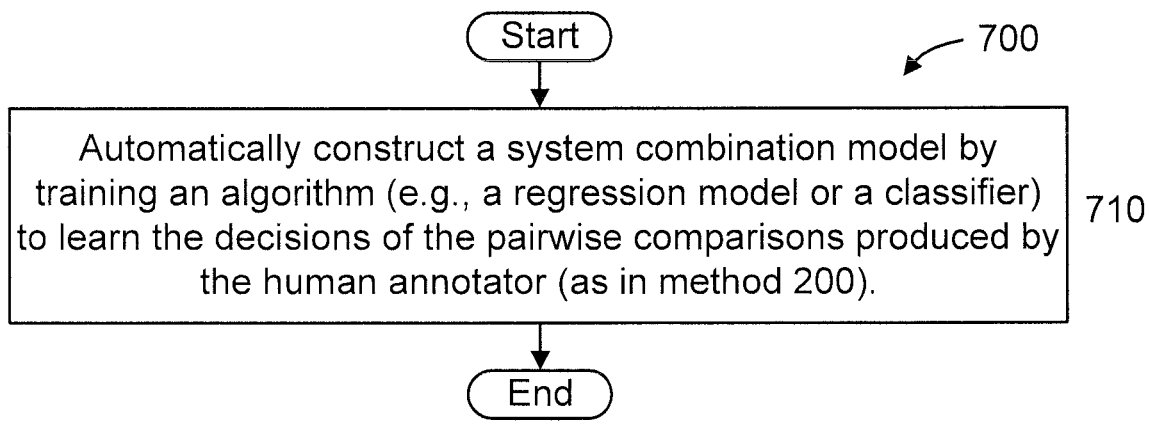
FIG. 7 shows still another exemplary method for building a system combination model, in accordance with an embodiment of the present principles.

The methods described in the Figures up to FIG. 4 describe how to collect and aggregate data to be used to build an actual model combination system. FIGS. 5, 6, and 7 are exemplars of how you would use that collected and aggregated data to build a model combination system. In an embodiment, one could consider the scores produced by FIG. 5 and FIG. 6 to be the weights of the models, while FIG. 7 uses a further machine-learning step to build a classifier that performs model combination.

FIG. 5 shows an exemplary method 500 for forming a model combination (a combination of models), in accordance with an embodiment of the present principles.

At step 510, compute the union of the results returned by the systems.

At step 520, assigning a score to each result equal to the sum of the votes of the systems that returned each result.

At step 530, rank the results in decreasing order of score.

FIG. 6 shows yet another exemplary method 600 for building a system combination model, in accordance with an embodiment of the present principles. Method 600 can be performed using the comparison set forth in method 300.

At step 610, compute a measure of similarity between the systems being compared. As one example of a measure of similarity, the average number of identical results returned in the top 10 for the same query can be used to measure similarity. Of course, the present principles are not limited to the preceding measure of similarity. That is, one of ordinary skill in the art will contemplate the preceding and other measures of similarity to which the present principles can be applied, while maintaining the spirit of the present principles.

At step 620, split the score accrued for each match between the winner and the loser according to their similarity. As one example of a similarity-based score split, if the similarity is a number between 0 and 1, the winner accrues a score of 1−0.5*similarity, and the loser accrues a score of 0.5*similarity. Of course, the present principles are not limited to the preceding similarity-based score split. That is, one of ordinary skill in the art will contemplate the preceding and other similarity-based score splits to which the present principles can be applied, while maintaining the spirit of the present principles.

FIG. 7 shows still another exemplary method 700 for building a system combination model, in accordance with an embodiment of the present principles.

At step 710, automatically construct a system combination model by training an algorithm (e.g., a regression model or a classifier) to learn the decisions of the pairwise comparisons produced by the human annotator (as in method 200).

In this embodiment, standard machine learning techniques can be applied to construct such combination model.

The method 700 of FIG. 7 can be used with any of the preceding methods described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a cloud computing node 810 is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and model combination and system adaptation using set-based user feedback.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for combining models, comprising:
forming, by a computer having a processor and a memory, model pairs from a model ensemble that includes a plurality of machine learning models;
comparing each of the model pairs in a same number of pairwise model output correctness comparisons with respect to questions matching expected answers and without model eliminations based on sets of model pair output results produced by the model pairs by providing only two of the sets of model pair output results to a user at any given time to obtain user-generated pairwise annotations for each of a win, a tie, or a loss, and splitting, based on a similarity between the model pairs based on one or more criterion, a fixed score between a winner and a loser in a given round in a model comparison process into two split scores; and
constructing, by the computer, a combination model from at least one of the model pairs by assigning respective scores to the user annotations for each of the win, the tie, or the loss, assigning to each of the models in the model pairs a vote that is equal to a cumulative score computed by adding the respective scores for wins, ties, and losses assigned thereto, assigning a vote-based score to each of the model pair output results equal to a sum of votes of any of the plurality of models that returned each of the model pair output results, and ranking the model pair output results in decreasing order of the vote-based score, wherein the ranking is indicative of a weight for each model pair in the constructed combination model, and wherein the two split scores are used to further determine the combination model; and
training, by the computer using the user-generated pairwise annotations, an automated machine learning process that uses the combination model to reproduce the user-generated pairwise annotations for other model pairs.

2. The method of claim 1, where said comparing step comprises:
displaying, at any given time, only two of the sets of model pair output results for the model pairs to the user; and
receiving an indication from the user of which of the sets of model pair output results provides best results for an intended purpose.

3. The method of claim 1, wherein said constructing step further comprises configuring an automated machine learning process to reproduce decisions made by the user by training the automated machine learning process with win annotations and loss annotations produced by the user for the models in the model pairs.

4. The method of claim 1, further comprising providing, based on the combination model, at least one of (i) a search result responsive to a search query, (ii) a response responsive to a question query, and (iii) a classification of an object responsive to a classification query.

5. The method of claim 1, wherein the combination model is a subject matter classifier.

6. A non-transitory computer readable storage medium comprising a computer readable program for combining models, wherein the computer readable program when executed on a computer causes the computer to perform the steps of:
forming model pairs from a model ensemble that includes a plurality of machine learning models; and
comparing each of the model pairs in a same number of pairwise model output correctness comparisons with respect to questions matching expected answers and without model eliminations based on sets of model pair output results produced by the model pairs by providing only two of the sets of model pair output results to a user at any given time to obtain user-generated pairwise annotations for each of a win, a tie, or a loss, and splitting, based on a similarity between the model pairs based on one or more criterion, a fixed score between a winner and a loser in a given round in a model comparison process into two split scores; and
constructing a combination model from at least one of the model pairs by assigning respective scores to the user annotations for each of the win, the tie, or the loss, assigning to each of the models in the model pairs a vote that is equal to a cumulative score computed by adding the respective scores for wins, ties, and losses assigned thereto, assigning a vote-based score to each of the model pair output results equal to a sum of votes of any of the plurality of models that returned each of the model pair output results, and ranking the model pair output results in decreasing order of the vote-based score, wherein the ranking is indicative of a weight for each model pair in the constructed combination model, and wherein the two split scores are used to further determine the combination model; and
training, by the computer using the user-generated pairwise annotations, an automated machine learning process that uses the combination model to reproduce the user-generated pairwise annotations for other model pairs.

7. A system, comprising:
a computer, having a processor and a memory, configured to:

form model pairs from a model ensemble that includes a plurality of machine learning models;

compare each of the model pairs in a same number of pairwise model output correctness comparisons with respect to questions matching expected answers and without model eliminations based on sets of model pair output results produced by the model pairs by providing only two of the sets of model pair output results to a user at any given time to obtain user-generated pairwise annotations for each of a win, a tie, or a loss, and split, based on a similarity between the model pairs based on one or more criterion, a fixed score between a winner and a loser in a given round in a model comparison process into two split scores;

construct a combination model from at least one of the model pairs by assigning respective scores to the user annotations for each of the win, the tie, or the loss, assigning to each of the models in the model pairs a vote that is equal to a cumulative score computed by adding the respective scores for wins, ties, and losses assigned thereto, assigning a vote-based score to each of the model pair output results equal to a sum of votes of any of the plurality of models that returned each of the model pair output results, and ranking the model pair output results in decreasing order of the vote-based score, wherein the ranking is indicative of a weight for each model pair in the constructed combination model, and wherein the two split scores are used to further determine the combination model; and train, by the computer using the user-generated pairwise annotations, an automated machine learning process that uses the combination model to reproduce the user-generated pairwise annotations for other model pairs.

8. The system of claim 7, wherein the computer is implemented as a server using a cloud computing configuration.

* * * * *